May 30, 1939.    H. H. STRONG    2,160,490
ELECTRODE FEEDING MEANS
Filed Jan. 24, 1936

INVENTOR
HARRY H. STRONG
BY
Herbert H. Thompson
HIS ATTORNEY.

Patented May 30, 1939

2,160,490

UNITED STATES PATENT OFFICE 2,160,490

ELECTRODE FEEDING MEANS

Harry H. Strong, Toledo, Ohio, assignor to The Strong Electric Corporation, Toledo, Ohio, a corporation of Ohio Application January 24, 1936, Serial No. 60,589

1 Claim. (Cl. 176—75)

This invention relates to automatic positioning means for maintaining the crater of the positive electrode of a searchlight or projector in the proper position with respect to the reflector or other condenser. For this purpose thermostats have been used in the past, which bring the feeding means into operation or increase the rate of movement thereof when the arc burns back beyond a predetermined position. Such systems have the disadvantage that the arc is advanced in steps so that a large part of the time it is not in the exact focus.

According to my invention, I propose to employ a photo-electric cell or cells in place of the usual thermostat and to control thereby a variable speed motor, the speed of which is governed by the output of the photo-electric cell in such manner as to be maintained uniformly at the proper value to maintain the crater in the exact focus of the projector without the disadvantages of the intermittent thermostatic feed.

My invention also consists in improved means for feeding the negative electrode.

Figure 1:
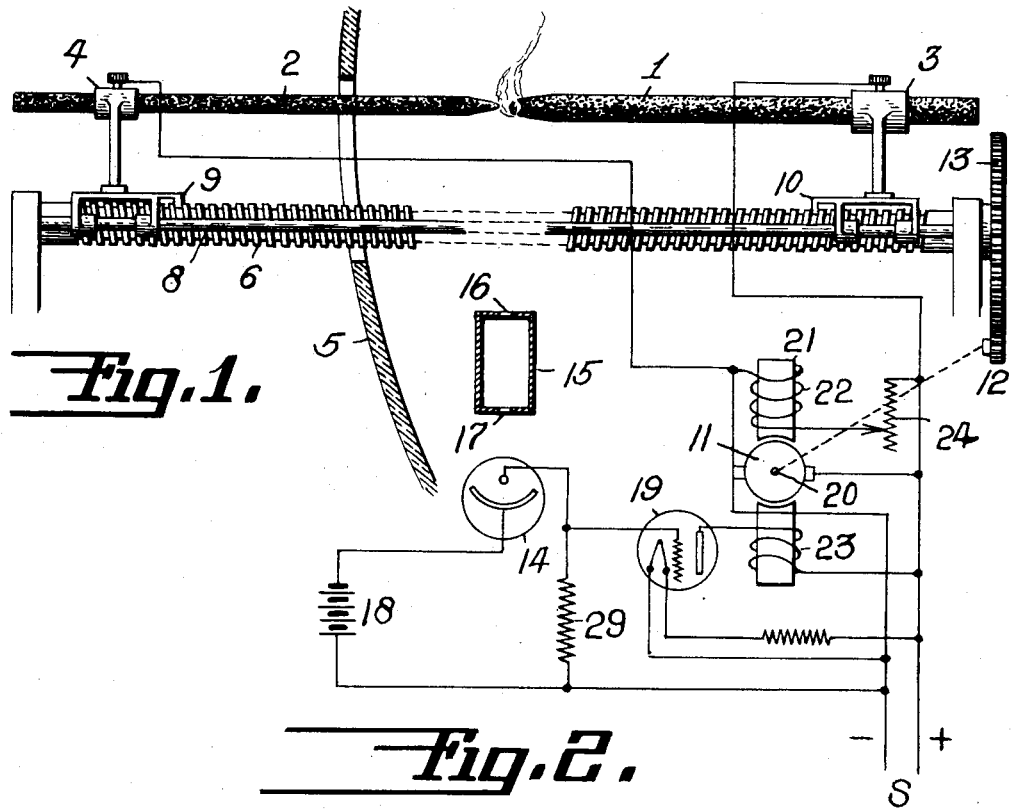
Fig. 1 is a diagram illustrating my improved feed for the positive, or both electrodes.

The positive electrode of a high intensity projector lamp is represented at 1, the negative electrode at 2, the same being held by the respective electrode holders 3 and 4. The reflector or other optical condenser device is shown at 5. In this instance, both electrodes are shown as fed from a common feed shaft 6, the threads thereof being of different pitch proportional to the usual relative rates of feed of each electrode. The holders are shown as slidably mounted on parallel bars 8, each holder having a tooth 9 or 10 engaging the threads for effecting the feeding of the electrode as the feed shafts are rotated. The rotating means in this instance is shown as a motor 11, represented as having a pinion 12 on the shaft of its armature, which turns a large gear 13 on the feed screw 6.

For controlling the motor from the position of the arc, I have shown a photo-electric cell 14 positioned behind a screen element 15 lying between the arc and the cell. This screen is adapted to cut off all light from the arc except a small pencil of light which passes through small spaced apertures 16 and 17 in the opposite ends of the cylindrical or rectangular shaped screen 15. By having two spaced apertures, the amount of light which reaches the photo-electric cell will be a maximum when the crater lies in the same straight line connecting the photo-electric cell and the two apertures, but is reduced approximately in proportion to the distance that the crater lies beyond or behind said line.

The output of the photo-electric cell is represented as applied to the grid of a thermionic relay energized from the main D. C. power source S. A battery or other source of E. M. F. 18 is provided in the photo-electric cell circuit to make the anode positive with respect to the cathode. The output of the cell is preferably amplified by the thermionic relay represented by the vacuum tube 19, the grid of which is connected to said cell anode. The cell 14 is in series with a grid bias resistor 29 for relay 19. The output current of the cell 14 produces a potential drop across resistor 29, which potential drop decreases with decrease in the illumination falling on cell 14, and vice versa. Hence, a decrease in the illumination falling on cell 14 due to an insufficiently fast feed of carbons 1 and 2 will result in a decrease in the bias on relay 19, causing the output current thereof to increase, which is applied to the feed motor 11 in such a way as to speed up the motor.

To this end, the motor 11 has, preferably, one part thereof, that is the field or armature, connected directly across the line, the armature 20 being shown as so connected in this instance. The other part, i. e., the field 21, is shown as having two windings 22 and 23, one of which is connected across the line through a suitable variable resistance 24 and the other, a differential field, is connected to the output from the thermionic tube 19. The current through said field windings is normally in opposition and the strength of the resultant field is initially adjusted by means of the rheostat 24. The resultant field is preferably a minimum when no light falls on the cell 14, at which time the rate of forward feed will be a maximum. The feed will therefore be gradually decreased as the amount of light falling on the photo-cell increases, until the required rate of feed is reached to keep the crater in focus.

Figure 2:
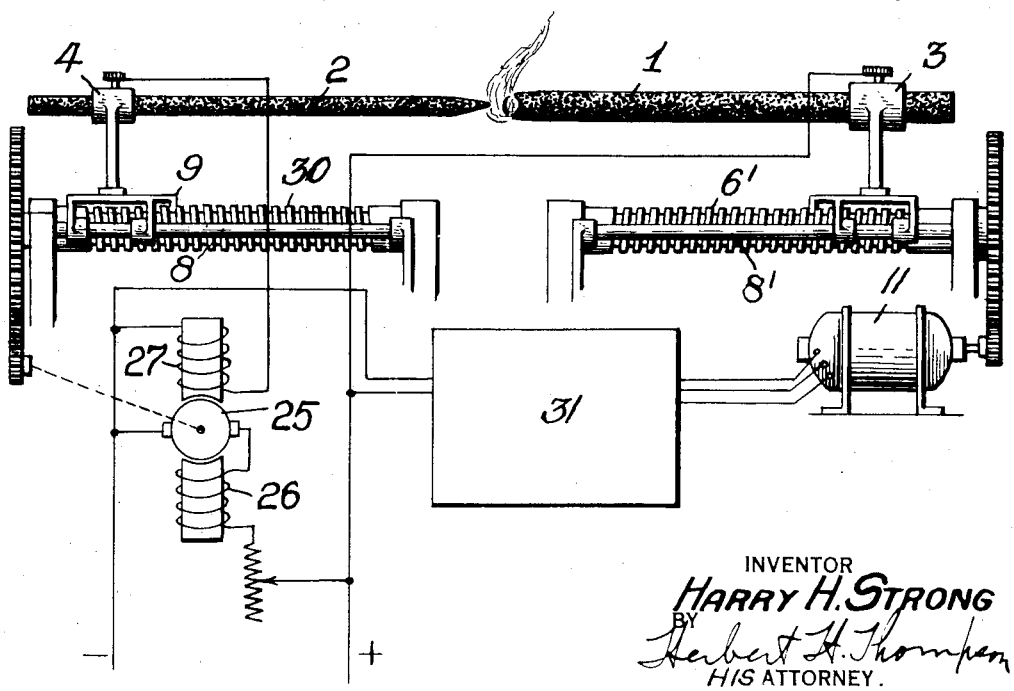
Fig. 2 is a diagram illustrating a modified form of negative feed, the positive feed remaining as in Fig. 1.

Instead of feeding the negative electrode from the motor 11, I may provide an independent motor 25 for feeding the same according to the voltage drop across the arc, as shown in Fig. 2. In this case separate feed screws 6' and 30 are provided for the two electrodes, the former being driven by motor 11 and the latter by motor 25. Preferably said motor 25 likewise has two field windings, a winding 26 in series with the armature across the arc and a shunt or separately excited winding 27 in series with the arc. With this arrangement a compensated feed is provided, insuring the maintenance of the proper arc in spite of variations in the supply voltage. The feed for the positive electrode may remain as before. The controls for feed motor 11, which may be the same as in Fig. 1, are represented as enclosed within control box 31.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

In an automatic feed for maintaining a fixed position of an electrode arcing tip, a photo-electric cell, means for focusing a beam from said arcing tip thereon as said tip approaches its predetermined position, a motor for feeding said electrode having a double wound field, one winding being constantly excited and the other continuously but variably excited by the output of said cell, whereby continuous graduated control of the position of said tip is maintained.

HARRY H. STRONG.